(12) United States Patent
Kubesh et al.

(10) Patent No.: US 7,305,383 B1
(45) Date of Patent: Dec. 4, 2007

(54) PROCESSING SYSTEM USING BITMAP ARRAY TO COMPRESS DETERMINISTIC FINITE AUTOMATION STATE TABLE ALLOWING DIRECT INDEXING

(75) Inventors: Blaine Kubesh, Cedar Park, TX (US); Gerald Lathem, Elgin, TX (US); Mohit Jaggi, Sunnyvale, CA (US); Amit Sinha, Santa Clara, CA (US); Michael Hall, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 403 days.

(21) Appl. No.: 10/866,377

(22) Filed: Jun. 10, 2004

(51) Int. Cl.
*G06F 7/00* (2006.01)
(52) U.S. Cl. ............... 707/3; 707/4; 707/6; 707/104.1; 717/152; 341/107
(58) Field of Classification Search ............... 707/3–6, 707/104.1; 717/152; 341/107
See application file for complete search history.

(56) References Cited

U.S. PATENT DOCUMENTS

| | | | |
|---|---|---|---|
| 5,740,239 A | 4/1998 | Bhagat et al. | |
| 6,560,610 B1 | 5/2003 | Eatherton et al. | |
| 6,785,677 B1* | 8/2004 | Fritchman | 707/6 |
| 2003/0128140 A1* | 7/2003 | Xie et al. | 341/107 |
| 2003/0233346 A1* | 12/2003 | Mathur et al. | 707/3 |
| 2004/0117778 A1* | 6/2004 | Sehr et al. | 717/152 |
| 2006/0059196 A1* | 3/2006 | Sato et al. | 707/104.1 |

OTHER PUBLICATIONS

P. Camurati et al., Proving Finite State Machines Correct with an Automaton-Based Method, Mar. 1-2, 1991, pp. 255-258.*

* cited by examiner

*Primary Examiner*—Apu Mofiz
*Assistant Examiner*—Jessica N Le
(74) *Attorney, Agent, or Firm*—Trellis Intellectual Property Law Group, PC (57) ABSTRACT

A processing system wherein a bitmap array is first used to obtain an index. The index is used to obtain a value from an array. A predefined default value is used to improve compression and speed in cases where a single default value is often encountered. In this embodiment the size of each entry in the bitmap array is one bit. In another approach, a bitmap array having two bit entries is provided. The use of two bits allows four different entry values. Two values are used to indicate two different default values. A third value is used for a "repeat" indicator to when the last-used next-state value should be re-used. The fourth value is used to indicate indexing into a pointer table, similarly to the embodiment using single-bit entries in the bitmap array.

20 Claims, 3 Drawing Sheets

PROCESSING SYSTEM USING BITMAP ARRAY TO COMPRESS DETERMINISTIC FINITE AUTOMATION STATE TABLE ALLOWING DIRECT INDEXING

COPYRIGHT NOTICE

A portion of the disclosure recited in the specification contains material which is subject to copyright protection. Specifically, a Computer Program Listing Appendix is provided that includes source code instructions for a process by which the present invention is practiced in a computer system. The copyright owner has no objection to the facsimile reproduction of the specification as filed in the Patent and Trademark Office. Otherwise all copyright rights are reserved.

BACKGROUND OF THE INVENTION

This invention relates in general to digital processing and more specifically to data lookup and indexing in a digital processing system.

A Deterministic Finite Automaton (DFA), or Finite State Machine (FSM), is a useful approach to solve many data processing tasks. For example, searching for a sequence, or "string" of characters for purposes of word searching in a document, password matching, etc., is often implemented with a DFA. Common DFA algorithms include Knuth-Morris-Pratt (KMP) and Boyer-Moore (BM). Essentially, these algorithms scan the string one character at a time and enter a "state" depending on the character presently input and the past input characters. The scan either results in a match if the string is detected before there are no more input characters to check, or else a non-match is indicated.

Computer processes or tasks that use the DFA approach often must operate in very demanding conditions. Speed is usually critical, especially where large amounts of text or other data must be scanned. For this reason the DFA must operate quickly. In other applications, memory, power, bandwidth or other limitations to processing resources can require the DFA to operate with as little storage as possible. This usually means that the data structures used by the DFA must be made as compact as possible.

Usually the two goals of compactness and speed work against each other. For example, one approach to reducing the size of DFA data structures is to require multiple levels of indirection or lookups, such as looking up an entry in a table or indexing into an array. However, each lookup requires processing cycles and results in a slower DFA. Data structures can often be compressed but that may require decompression, decoding or other computation on-the-fly for the DFA to be able to use the data.

One attempt at optimizing DFA data structures and processing is described, for example, in Aho, A. V., Sethi, R., Ullman, J. D. Compilers: Principles, Techniques, and Tools. Addison-Wesley. 1986. (pp 144-146). Many different approaches exist for such optimizations and the nature of computing is such that even a very small or marginal improvement in size of a data structure or datum, or increase in speed of operation of one or a few operations can provide a very significant overall improvement of the operation of a process using a DFA approach.

SUMMARY OF EMBODIMENTS OF THE INVENTION

One embodiment of the present invention provides a DFA approach wherein a compressed bitmap array is first used to obtain an index. The index is used to obtain a pointer (e.g., to a next DFA state) from a pointer table. A predefined default value is used to improve compression and speed in cases where a single default value (e.g., end-of-string) is often encountered. In this embodiment the size of each entry in the bitmap array is one bit.

In a different, preferred, embodiment a bitmap array having two bit entries is provided. The use of two bits allows four different entry values. Two values are used to indicate two different default values. A third value is used for a "repeat" indicator to when the last-used pointer value should be re-used. The fourth value is used to indicate indexing into a pointer table, similarly to the embodiment using single-bit entries in the bitmap array.

In one embodiment the invention provides a method for obtaining next state information in a digital process, the method comprising the following steps performed by a digital processor: parsing a bitmap array, wherein the bitmap array includes bit entries having values; if a bit entry is of a first value then using a default pointer to obtain a next state; if the bit entry is not of the first value then counting a number of occurrences of a bit value in a bitmap array to achieve an index value; and using the index value to access a pointer array to obtain a value for a next state.

In another embodiment the invention provides an apparatus for obtaining next state information in a digital process, the apparatus comprising a digital processor; a machine readable medium including instructions executable by the digital process, comprising: one or more instructions for parsing a bitmap array, wherein the bitmap array includes bit entries having values; one or more instructions for checking if a bit entry is of a first value and, if so, then using a default pointer to obtain a next state; one or more instructions for checking if the bit entry is not of the first value and, if so, then counting a number of occurrences of a bit value in a bitmap array to achieve an index value; and using the index value to access a pointer array to obtain a value for a next state.

In another embodiment the invention provides a machine-readable medium including instructions executable by a processor, the machine-readable medium comprising a digital processor; a machine readable medium including instructions executable by the digital process, comprising: one or more instructions for parsing a bitmap array, wherein the bitmap array includes bit entries having values; one or more instructions for checking if a bit entry is of a first value and, if so, then using a default pointer to obtain a next state; one or more instructions for checking if the bit entry is not of the first value and, if so, then counting a number of occurrences of a bit value in a bitmap array to achieve an index value; and using the index value to access a pointer array to obtain a value for a next state.

DETAILED DESCRIPTION OF EMBODIMENTS OF THE INVENTION

A preferred embodiment of the invention is intended for use with intrusion detection systems for networks. Signatures are based on regular expressions (regex) that are matched to known, permitted signatures. The preferred embodiment uses a DFA approach and is the embodiment of FIG. 2. However, a different embodiment is first discussed in connection with FIG. 1 since the FIG. 1 embodiment is essentially a subset of the approach of FIG. 2. Note that aspects of the present invention can be adapted for use with many other applications besides regular expression matching. In some applications aspects of the invention may be applied to an approach not classified as a DFA, FSM or other related techniques.

Figure 1:
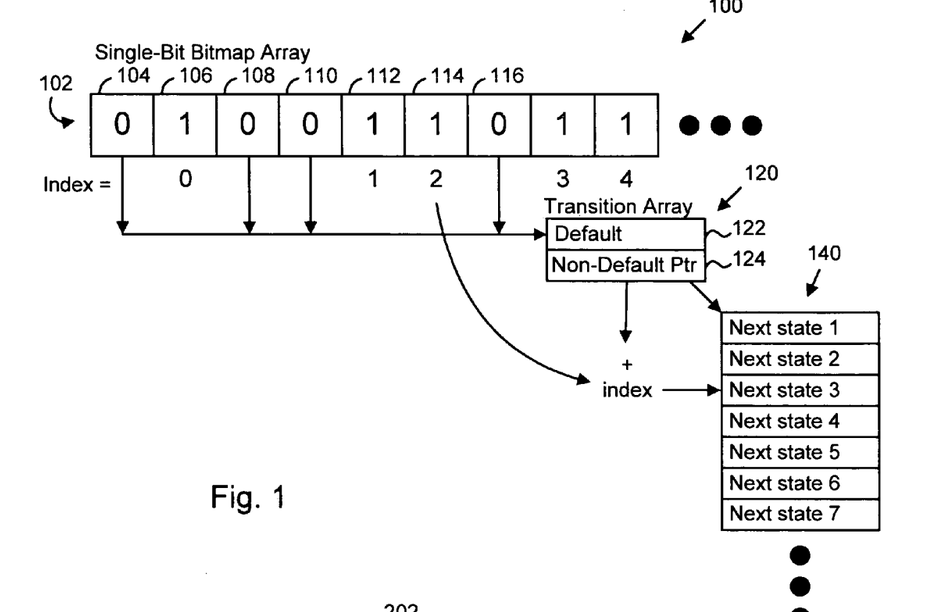
FIG. 1 shows basic steps and data structures in a single-bit bitmap array embodiment.

In FIG. 1, DFA 100 includes single-bit bitmap array 102 having single-bit entries such as 104, 106, 108, 112, 114, 116, etc. Single-bit bitmap array 102 can be of arbitrary length. However, when the number of unique non-default transitions in the array exceeds 16 then the two-bit bitmap array discussed below in connection with FIG. 2 can more efficient.

Each array corresponds to a state in the DFA. Each entry in a current bitmap array corresponds to a transition from the current state to a next state. In FIG. 1, entry 104 is the first entry, entry 106 is the second entry, and so on. In a regular expression application, for example, a current letter or symbol in a string is analyzed and corresponds to an entry. For example, the character "A" can correspond to the 65th entry and subsequent characters can correspond, in ASCII, alphabetical, or other order, to subsequent entries. ASCII representation can include ASCII values 0 (NUL)-127 (DEL) and Extended ASCII values 128-255. Values above 127 are typically used directly in the regex as hex characters. Hex value "\xFF" would be 255, for example. The bitmap array is parsed from beginning to end (e.g., left-to-right in FIG. 1) until the entry corresponding to the current character is achieved. During the parsing, the process or processor executing the DFA keeps a count of the number of non-zero entries starting from a value of zero. The count is used as the subsequent index for looking up a pointer to the next state's bitmap array.

In a preferred embodiment, the entire bitmap array does not have to be parsed to determine the count. A bit entry is represented as word/offset where the upper 3 bits of the input is a word position and the lower 5 bits of the input are the bit offset. This allows directly accessing the 32-bit/4-byte word that contains the bit of interest. During compile time a 7-byte lookup table is stored to record the number of bits set in all words leading up to the current word. This bit count is added to the bit count calculation of the current word containing the bit entry. The number of bits set in the current word up to the bit entry is also calculated using a 16-bit bit-count lookup table. If the bit entry offset is greater than 15, then the lower 16 bits are looked up in the bit-count table, the upper 16 bits are then masked to only include bits of interest, shifted to the lower portion of the word register and then looked up in the bit-count table as well. Otherwise, when bit entry offset is less than or equal to 15, the lower 16 bits are masked to include bits leading up to and including the bit entry and looked up in the bit-count table. Other embodiments can use any other suitable approach for bitmap representation and indexing.

For example, FIG. 1 shows that entry 106 has a corresponding index of zero since it is the first non-zero entry in the array. Entry 112 has an index of 1, entry 114 has an index of 2, and so on. Entries with value zero, such as entries 104, 108, 110 and 116 are assigned default pointer value 122 from transition array 120. Entries that are non-zero obtain a pointer value by using the computed index along with non-default value 124 from transition array 120. The default state transition is calculated in FIG. 1, by using the state transition that occurs most often. Both the default and non-default state transitions are calculated and stored during pre-processing of the regex patterns when the DFA is being created. The non-default values are determined from the input regular expression patterns.

In the case where an entry has value zero, the default pointer value is used to obtain the next state's bitmap array. In the case where the entry has a non-zero value (i.e., "1" in the case of a one-bit bitmap array) the pointer value is obtained by using non-default pointer value 124 as a base array pointer along with the index value (or a value derived from the index value such as by shifting, multiplying, etc., the index value) and the resulting lookup value is used to access pointer array 140 to obtain one of the non-default next state values. The non-default next state value obtained from array 140 is then used to obtain the bitmap array for the next state 218.

Figure 2:
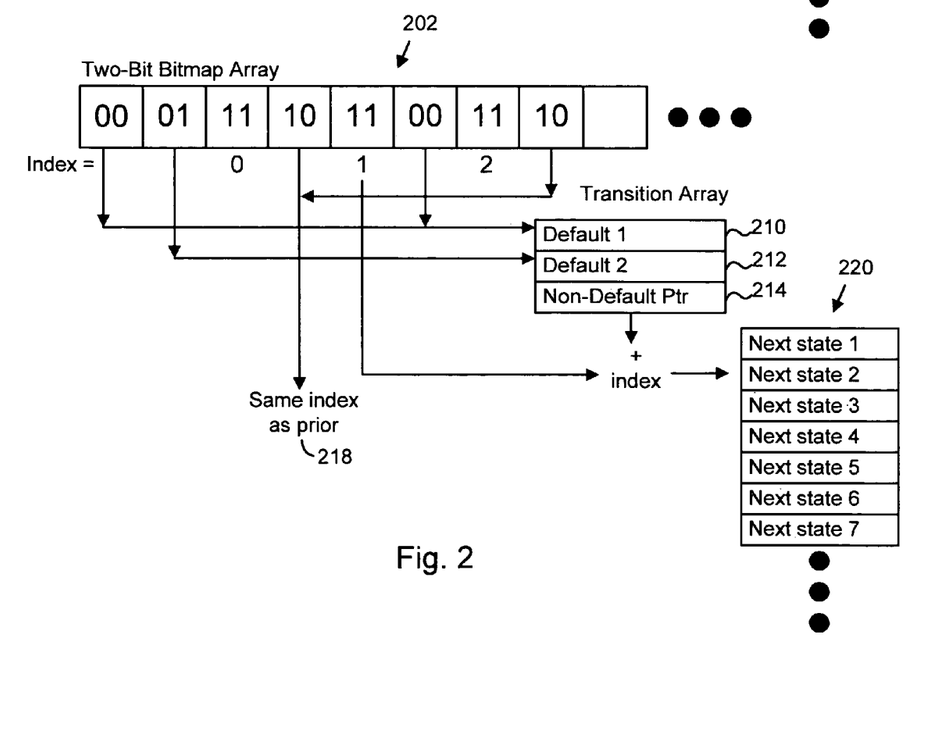
FIG. 2 shows basic steps and data structures in a two-bit bitmap array embodiment.

FIG. 2 shows a preferred embodiment where a two-bit bitmap array is used.

In FIG. 2, two-bit bitmap array 202 is handled similarly to the one-bit bitmap array of FIG. 1 with respect to zero entry values in that the zero entry values each obtain default value 210 for use in obtaining the next bitmap array for the next state. Entry values of 01 also are used to obtain a default value but the 01 default value is second default value 212 that can be different from the first default value. The ability to use two different default values can provide a higher level of compression for the pointer array. Another feature of the two-bit bitmap array is that entries with a value of 10 are range continuations and do not need a next state to be stored since the next state is the same as the last state used.

In the two-bit bitmap array approach, entries with value 11 are counted during parsing for purposes of obtaining an index corresponding to the entry value. For example, the third entry in FIG. 2 has an index of zero. The fifth entry has an index of 1, the seventh entry has an index of 2, and so on. Similar to the case of FIG. 1, entries that have a 11 value cause a non-default next state value in 220 to be obtained by combining the index with base array pointer value 214.

The approach of FIG. 2 using a two-bit bitmap array can provide advantages such as a higher level of compression for data structures due to eliminating redundancy of default and non-default values.

Naturally different numbers of bits can be used for bitmap array entries. In some embodiments it may be possible, and desirable, to use a variable number of bits for different entries in the same bitmap array. Different entry values can be used apart from those shows herein for defaults, last-used, lookup and other functions.

Figure 3:
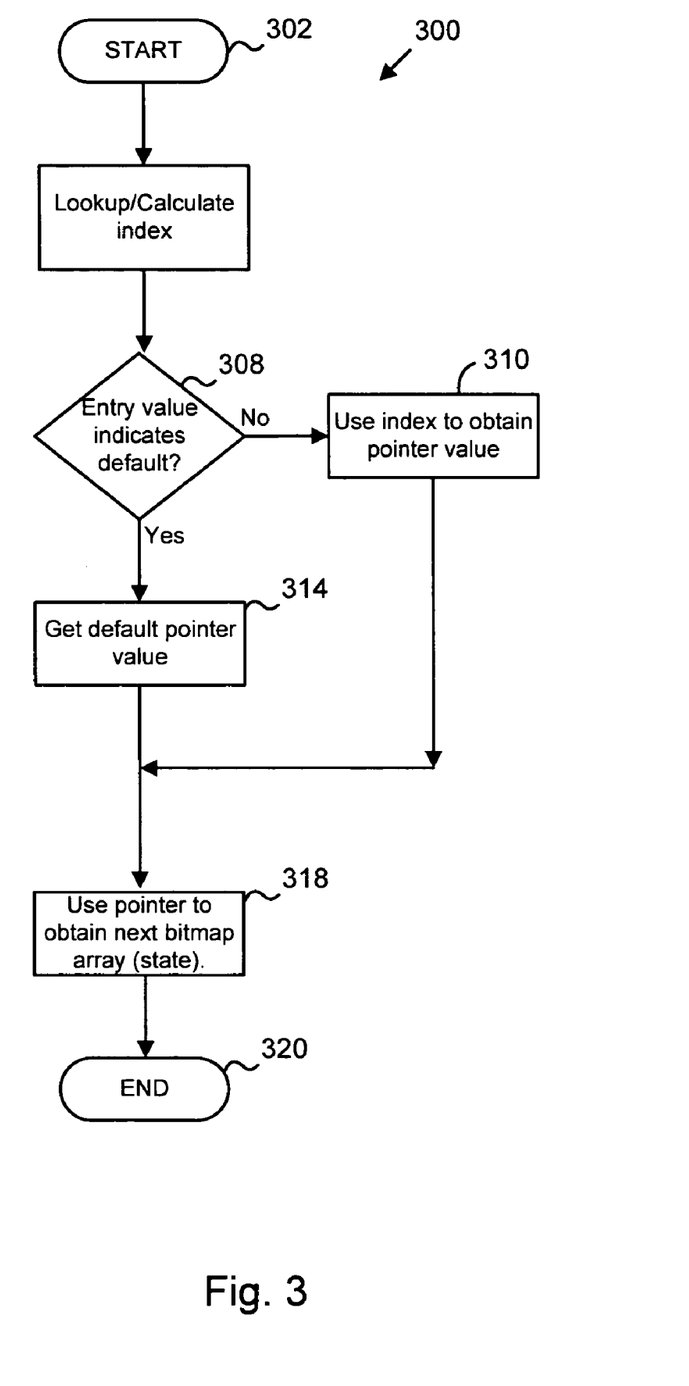
FIG. 3 is a flowchart of a DFA embodiment according to the present invention.

FIG. 3 shows a flowchart illustrating basic steps of a preferred embodiment of the invention. The steps are generalized to include both of the embodiments discussed above.

In FIG. 3, flowchart 300 is entered at step 302 where it is assumed that a bitmap array corresponding to a present state is provided. Step 304 is executed to index the bitmap array. At step 308, a check is made as to whether the desired entry's value indicates that a default pointer value is to be used. Note that any number of default pointer entries can be provided depending upon the number of bits used for the entry values. Also, as discussed above in connection with FIG. 2, different schemes for obtaining values (e.g., last-used, default, etc.) can be incorporated. If, at step 308, it is determined that the entry value indicates use of a default or other value then step 314 is executed to obtain the default (or other) value. Otherwise, execution proceeds to step 310 where the index value is used to obtain the pointer value.

After executing either of steps 310 or 314 execution proceeds to step 318 where the pointer is used to obtain the next state's bitmap array. The routine exits at step 320 where it can be entered again at step 302 to parse the newly-obtained bitmap array for the next state.

Note that the flowcharts presented in this specification are merely examples of the broad, basic steps of one or more specific ways to achieve functionality according to the present invention. In general, steps can be added to, removed from, or changed from those described. For example, the pseudo source code listed in the Computer Program Listing Appendix includes routines such as nextState( ) that iterates the nodes, or states as described by steps 304, 306, 312 and 316 of the flowchart. Another routine, convert DFA( ), is described that converts a conventional DFA format to bitmap compressed. This functionality is in addition to the functionality described in the flowchart of FIG. 3. Also, the routine compressDFA( ) provides additional functionality that uses an optional compression scheme to further compress the bitmap format. In general, additional steps or techniques to improve or optimize the approach of the embodiments can be used, as desired.

Figure 4:
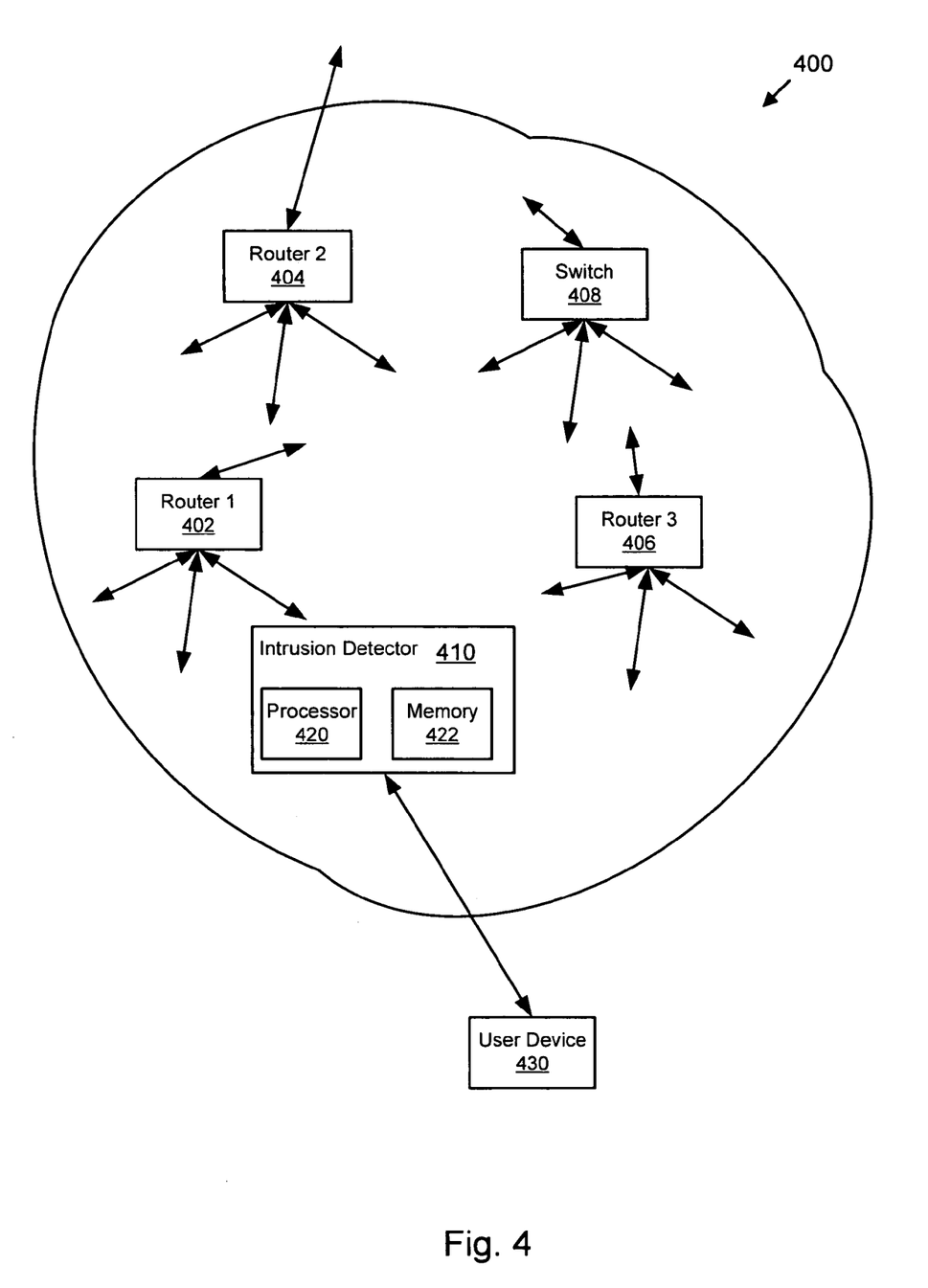
FIG. 4 illustrates a network application of a DFA.

FIG. 4 illustrates a system wherein a preferred embodiment of the invention is applied. In FIG. 4, network 400 includes various network devices such as routers 402, 404 and 406, switch 408, intrusion detector 410, and user device 430. Intrusion detector 410 includes processor 420 and associated resources such as memory 422. Memory 422 includes an image of a program for providing functionality according to the present invention. The program is executed by processor 420 in a manner that is known in the art. This application allows internet data to and from user device 430 to be inspected for known computer security signatures, such as a too many bad password attempts, buffer overflows, etc. The internet data can be parsed and checked as described above by the DFA of the present invention.

FIG. 4 is a simplified network and device diagram. Other components and designs can be used.

Although the invention has been described with respect to specific embodiments thereof, these embodiments are merely illustrative, and not restrictive of the invention. For example, other embodiments can use different numbers and types of steps and data structures. Additional data structures can be used so that, for example, the lookup of pointer array values can be a two-step process. Features provided in other inventions and approaches can be combined with those shown herein. It may be possible to omit steps and structures in other embodiments.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable" or "machine readable" medium for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

```
SOURCE CODE APPENDIX - Copyright Cisco Systems, Inc. 2004
// Data structure to represent the DFA.
{
// The number of states in the automaton.
dfa_state_t              _num_states;
// The number of tags in the automation.
unsigned char            num_tags;
// The implementation of this automata
state_array_t            *stateArray;
// Pointer to the contiguous memory chunk where the character ranges
are stored
dfa_state_t              *rangeDataPtr;
// number of char ranges and next states pointed to by rangeDataPtr &
nextStatePtr
unsigned int             rangeCount;
// Pointer to the contiguous memory chunk where the actual alarm data
is stored.
alarm_id_t               *stateAlarmDataPtr;
// number of state alarms pointed to by stateAlarmDataPtr
unsigned int             stateAlarmCount;
// Pointer to the contiguous memory chunk where the actual tag data is
stored.
unsigned char            *stateTagDataPtr;
// number of state tags pointed to by stateTagDataPtr
unsigned int             stateTagCount;
struct state_array_t {
    // Transitions are represented by a character range and next state
array.
    dfa_state_t    *ranges;
    // the most common transition is removed from the trans list and
called default.
    alarm_id_t     *alarms;
    unsigned char  *tags;
    dfa_state_t    default_next1;
    dfa_state_t    default_next2;
    unsigned short num_alarms;
    unsigned char  is_tag;
    unsigned char  is_final;
    unsigned char  num_tags;
    unsigned char  num_ranges;
    unsigned char  rangeCount[7];  // Stores the cumulative number of
ranges in previous words. (bit count of bitset1&bitset2 per word)
                                   // used when no hw bitcount
instruction is available.
    unsigned int   bitset1[8];     // set of bits that indicate if a
nondefault transition exists for an input.
    unsigned int   bitset2[8];
```

-continued

```
        };
}
// optional compression strategy to take advantage of redundancy in
range patterns.
// compression is performed 'inplace', with no new memory being
allocated.
// Tests on dataset show an average 10-15% space reduction using this
method.
void compressDFA( DFA ) {
        newRangeCount=0;
        newRangeEndPtr = DFA->rangeDataPtr;
    for each STATE in DFA {
            // search the stored ranges for redundancy
            tmpRangePtr = Search(DFA->stateArray[STATE] .ranges, DFA-
>stateArray[STATE] .num_ranges,
                                            DFA-
>stateArray[STATE] .rangeDataPtr, newRangeCount);
            if (!tmpRangePtr) {
                    // no redundancy found for this set of ranges.
                    tmpRangePtr = newRangeEndPtr;
                    if (DFA->stateArray[STATE] .ranges != newRangeEndPtr) {
                            // copy the ranges into new position.
                    for (unsigned j=0; j<DFA->stateArray[STATE] .num_ranges;
j++) {
                            *newRangeEndPtr++ = DFA-
>stateArray[STATE] .ranges[j];
                            newRangeCount++;
                    }
            } else {
                        // no need to copy, nothing compressed yet.
                    newRangeCount += DFA->stateArray[STATE]->num_ranges;
                    newRangeEndPtr += newRangeCount;
                }
            } else {
                    // redundancy was found, use it.
                    // else clause intentionally left blank
                    // the range pointer gets set to the redundant
location returned from Search.
            }
            DFA->stateArray.ranges = tmpRangePtr;
    }
        // Shrink memory allocations if possible to new requirements.
        if (newRangeCount < DFA->rangeCount) {
                DFA->rangeDataPtr = realloc(DFA->rangeDataPtr,
newRangeCount);
        }
}
// convert a DFA from conventional array format to new representation
convertDFA(oldDFA) {
    // allocate space for new DFA
        // number of states stays the same.
        newDFA = allocate( . . . );
        // copy outputs from oldDFA to newDFA
        newDFA->outputs = oldDFA->outputs
        last_dest = 1;
        tmpRangeSize = 0;
        tmpRangeDataPtr = newDFA->rangeDataPtr;
        for each STATE in oldDFA {
            newDFA->stateArray[STATE] .default1 =
    calcMostCommonRange (oldDFA->transitions[STATE]);
            newDFA->stateArray[STATE] .default2 =
    calcMostCommonTransition (oldDFA->transitions[STATE], default1); //
exclude default1
            newDFA->stateArray[STATE] .ranges = tmpRangeDataPtr;
            for each TransitionChar from 0 to 255 {
                    destDfaState = oldDFA-
>transitions[STATE] [TransitionChar];
                    if (destDfaState == newDFA-
>stateArray[STATE] .default1 ) {
                        CLEAR_BIT(TransitionChar, newDFA-
>stateArray[STATE] .bitset1);
                                CLEAR_BIT(TransitionChar, newDFA-
>stateArray[STATE] .bitset2);
                            } else if (destOfaState == newDFA-
>stateArray[STATE] .default2 ) {
                        CLEAR_BIT(TransitionChar, newDFA-
>stateArray[STATE] .bitset1);
                                SET_BIT(TransitionChar, newDFA-
>stateArray[STATE] .bitset2);
```

-continued

```
            } else if (last_dest != destDfaState) {
                // new range required
                last_dest = destDfaState;
                if (tmpRangeSize != 0) {
                    tmpRangeDataPtr++;
                }
                tmpRangeSize++;
                    // store the range
                *tmpRangeDataPtr = destDfaState;
                SET_BIT(TransitionChar, newDFA-
    >stateArray[STATE].bitset1);
                SET_BIT(TransitionChar, newDFA-
    >stateArray[STATE].bitset2);
            } else {
                SET_BIT(TransitionChar, newDFA-
    >stateArray[STATE].bitset1);
                CLEAR_BIT(TransitionChar, newDFA-
    >stateArray[STATE].bitset2);
            }
        }
    }
    if (tmpRangeSize > 0) {
        tmpRangeDataPtr++;
    }
    pNewState->num_ranges = tmpRangeSize;
    // convert the lkupTable range counts to be cumulative
    // Counts for words 0-6 = 7, 0-5 = 6, etc. and 0 is always 0.
    int total=0;
    newDFA->stateArray[STATE].rangeCount[0] = 0;
    for (int k=0; k<8; k++) {
        unsigned int tmpVal = newDFA->stateArray[STATE].bitset1[k]
& newDFA->stateArray[STATE].bitset2[k];
        total += countNumberOfBitsSet(tmpVal);
        if (k<7) {
            newDFA->stateArray[STATE].rangeCount[k+1] = total;
        }
    }
  }
}
dfa_state_t nextState( dfa_state_t curState, in_alphabet_t c) {
        state_array_t *curTrans = &stateArray[curState];
        unsigned char wordPos = c >> 5;
        unsigned char bitPos = c & 0x1F;
        unsigned int wordMaskBit = 1 << bitPos;
        // Is this a default transition or is it stored in a range?
        if ((curTrans->bitset1[wordPos] & wordMaskBit) == 0) {
            // It is a default, but which one, #1 or #2?
            if ((curTrans->bitset2[wordPos] & wordMaskBit) != 0) {
                // Default #2
                return (curTrans->default_next2);
            } else {
                // Default #1
                return (curTrans->default_next1);
            }
        } else {
            // non-default transition, we need to find it in the range
set
            unsigned int wordMask    = wordMaskBit | (wordMaskBit − 1);
            unsigned int word_AandB  = curTrans->bitset1[wordPos] &
curTrans->bitset2[wordPos] & wordMask;
            unsigned int count       = curTrans->rangeCount1[wordPos];
            // check for bitpos in upper word and lower half of word !=
0
            // 2 options here, either lookup in rangecount2, OR lookup
it up in the bitcount16 table.
            // Also consider prefetching the bitcount16 values inside
the IF statement.
            if (bitPos > 15) {
                if (word_AandB & 0xFFFF) {
                    // Add in the short-word range count;
                    // Each word is 4-bits in rangeCount2
                    // count += ((curTrans->rangeCount2 >> (wordPos *
4)) & 0xf) + 1;
                    count += bitcount16[word_AandB & 0xFFFF];
                }
                word_AandB = word_AandB >> 16;
            }
            count += bitcount16(word_AandB & 0xFFFF);
            // Adjust for 0 indexed array.
```

-continued

```
        count--;
        ret = curTrans->ranges[count];
    }
    return ret;
};
```

What is claimed is:

1. A method for obtaining next state information in a digital process, the method comprising the following steps performed by a digital processor:
   parsing a plurality of next state values for state transitions;
   determining a most frequently occurring next state value in the plurality of next state values for state transitions, the most frequently occurring next state value being a next state value that occurs the most frequently in the next state values and non-default values being other values in the plurality of next state values;
   storing the most frequently occurring next state value in a position for the most frequently occurring next state in an pointer array and storing non-default next state values in a plurality of other positions in the pointer array;
   parsing a bitmap array to determine a transition from a present state to a next state, wherein the bitmap array includes bit entries having values;
   if a bit entry is of a first value then determining the most frequently occurring next state value as the next state;
   if the bit entry is not of the first value then counting a number of occurrences of a bit value in the bitmap array to achieve an index value; and
   using the index value to access the pointer array to obtain a non-default next state value for the next state.

2. The method of claim 1, further comprising using the next state in a deterministic finite automaton.

3. The method of claim 1, further comprising using the next state in a finite state machine.

4. The method of claim 1, further comprising using the next state in a string matching operation.

5. The method of claim 1, wherein a plurality of bits are used for one or more entries in the bitmap array, the method further comprising
   storing a second most frequently occurring next state value in a second position for the second most frequently occurring next state in the pointer array;
   if a bit entry is of a second value then determining the second most frequently occurring next state value to obtain the next state.

6. The method of claim 5, wherein two bits are used for bit entries in the bitmap array, wherein the most frequently occurring next state value and the second most frequently occurring next state value correspond to two different default pointer values for obtaining states.

7. The method of claim 1, wherein at least one entry in the bitmap array includes a plurality of bits, the method further comprising
   determining one of a plurality of most frequently occurring next state values to obtain a next state depending upon the value of a bitmap entry.

8. The method of claim 1, further comprising adding the index value to a base table to obtain a value for a next state.

9. An apparatus for obtaining next state information in a digital process, the apparatus comprising:
   one or more digital processors;
   a machine readable storage medium including instructions executable by the digital processors, comprising
   one or more instructions for parsing a plurality of next state values for state transitions;
   one or more instructions for determining a most frequently occurring next state value in the plurality of next state values for state transitions, the most frequently occurring next state value being a next state value that occurs the most frequently in the next state values and non-default values being other values in the plurality of next state values;
   one or more instructions for storing the most frequently occurring next state value in a position for the most frequently occurring next state in an pointer array and storing non-default next state values in a plurality of other positions in the pointer array;
   one or more instructions for parsing a bitmap array to determine a transition from a present state to a next state, wherein the bitmap array includes bit entries having values;
   one or more instructions for checking if a bit entry is of a first value and, if so, then determining the most frequently occurring next state value as the next state;
   one or more instructions for checking if the bit entry is not of the first value and, if so, then
   counting a number of occurrences of a bit value in the bitmap array to achieve an index value; and
   using the index value to access the pointer array to obtain a non-default next state value for a next state.

10. A machine-readable storage medium including instructions executable by a processor for obtaining next state information in a digital process, the machine-readable medium comprising:
    one or more instructions for parsing a plurality of next state values for state transitions;
    one or more instructions for determining a most frequently occurring next state value in the plurality of next state values for state transitions, the most frequently occurring next state value being a next state value that occurs the most frequently in the next state values and non-default values being other values in the plurality of next state values;
    one or more instructions for storing the most frequently occurring next state value in a position for the most frequently occurring next state in an pointer array and storing non-default next state values in a plurality of other positions in the pointer array;
    one or more instructions for parsing a bitmap array to determine a transition from a present state to a next state, wherein the bitmap array includes bit entries having values;
    one or more instructions for checking if a bit entry is of a first value and, if so, then determining the most frequently occurring next state value as the next state;
    one or more instructions for checking if the bit entry is not of the first value and, if so, then counting a number of occurrences of a bit value in the bitmap array to achieve an index value; and using the index value to access the pointer array to obtain a non-default next state value for a next state.

11. An apparatus for obtaining next state information in a digital process, the apparatus comprising:

means for parsing a plurality of next state values for state transitions;

means for determining a most frequently occurring next state value in the plurality of next state values for state transitions, the most frequently occurring next state value being a next state value that occurs the most frequently in the next state values and non-default values being other values in the plurality of next state values;

means for storing the most frequently occurring next state value in a position for the most frequently occurring next state in an pointer array and storing non-default next state values in a plurality of other positions in the Pointer array;

means for parsing a bitmap array to determine a transition from a present state to a next state, wherein the bitmap array includes bit entries having values;

means for determining the most frequently occurring next state value as the next state if a bit entry is of a first value;

means for counting a number of occurrences of a bit value in the bitmap array to achieve an index value, if the bit entry is not of the first value; and means for using the index value to access the pointer array to obtain a non-default next state value for the next state.

12. The apparatus of claim 11, further comprising:
means for using the next state in deterministic finite automaton.

13. The apparatus of claim 11, further comprising:
means for using the next state in a finite state machine.

14. The apparatus of claim 11, further comprising:
means for using the next state in a string matching operation.

15. The apparatus of claim 11, wherein a plurality of bits are used for one or more entries in the bitmap array, the apparatus further comprising means for storing a second most frequently occurring next state value in a second position for the second most frequently occurring next state in the pointer array;

means for determining the second most frequently occurring next state value to obtain the next state if a bit entry is of a second value.

16. The apparatus of claim 15, wherein two bits are used for bit entries in the bitmap array, wherein the most frequently occurring next state value and the second most frequently occurring next state value correspond to two different default pointer values for obtaining states.

17. The apparatus of claim 11, wherein at least one entry in the bitmap array includes a plurality of bits, the apparatus further comprising:

means for determining one of a plurality of most frequently occurring next state values to obtain a next state depending upon the value of a bitmap entry.

18. The apparatus of claim 11, further comprising:
means for adding the index value to a base table to obtain a value for a next state.

19. The method of claim 1, wherein the most frequently occurring next state value is stored once in the position for the most frequently occurring next state and redundant occurrences are removed from the plurality of next state values and not stored in the pointer array.

20. The method of claim 19, wherein the non-default values are stored in the other positions in the pointer array, wherein the non-default values include values that occur multiple times.

* * * * *